Nov. 4, 1952 W. F. KANNENBERG 2,616,971

AUTOMATIC VOLUME CONTROL

Filed March 5, 1949 2 SHEETS—SHEET 1

INVENTOR
W. F. KANNENBERG
BY
[signature]
AGENT

Nov. 4, 1952 W. F. KANNENBERG 2,616,971
AUTOMATIC VOLUME CONTROL
Filed March 5, 1949 2 SHEETS—SHEET 2

INVENTOR
W. F. KANNENBERG
BY
[signature]
AGENT

Patented Nov. 4, 1952 2,616,971

UNITED STATES PATENT OFFICE 2,616,971

AUTOMATIC VOLUME CONTROL

Walter F. Kannenberg, Gillette, N. J., assignor to Bell Telephone Laboratories, Incorporated, New York, N. Y., a corporation of New York Application March 5, 1949, Serial No. 79,815

2 Claims. (Cl. 179—1)

This invention relates to an improved system for the automatic volume control of a sound program reproduced in a noisy listening area. It is particularly useful when it is desired to make the program volume at all times high enough to override the noise in the area as this noise varies in level. The system herein described is accordingly termed a "continuously adjusting" system, thereby distinguishing it from the "interval adjusting" system where the program volume is controlled by the noise level in an interval preceding the rendition of a program.

The general object of the invention is to provide an improved system of apparatus by means of which a sound program may be satisfactorily reproduced despite the presence of disturbing noise.

Systems intended for the same object are known to the art, for example, one is disclosed by E. Stanko in United States Patent 2,338,551, January 4, 1944. In that disclosure, as in the present one, there is shown a variable gain amplifier in the program reproducing channel, the gain of which is varied in accordance with the difference of two rectified voltages, one of which varies with the program level fed to a loudspeaker while the other varies with the output of a microphone picking up the disturbing noise. The present system, however, contains a limiter which insures stability without curtailment, at either end, of the frequency range of either program reproduction or noise microphone response; this is accomplished by limiting the additional change in gain as the noise increases beyond a reasonably high level, up to which level the gain of the program channel rises uniformly with rise in noise.

Besides insuring stability, the limiter prevents the undesirable excessive sound level, and perhaps overload of the amplifier supplying the loudspeaker, which otherwise might come about in the presence of extreme bursts of noise.

It is therefore an object of the invention to provide an electrical sound system of which the sound output continuously varies in level with the level of disturbing noise, but with limitation of variation of sound output in the case of extreme variation in noise.

The invention will be fully understood from the following description of a preferred embodiment thereof, read with reference to the accompanying drawings, in which.

In all figures, like elements are designated by like numerals.

Figure 1:
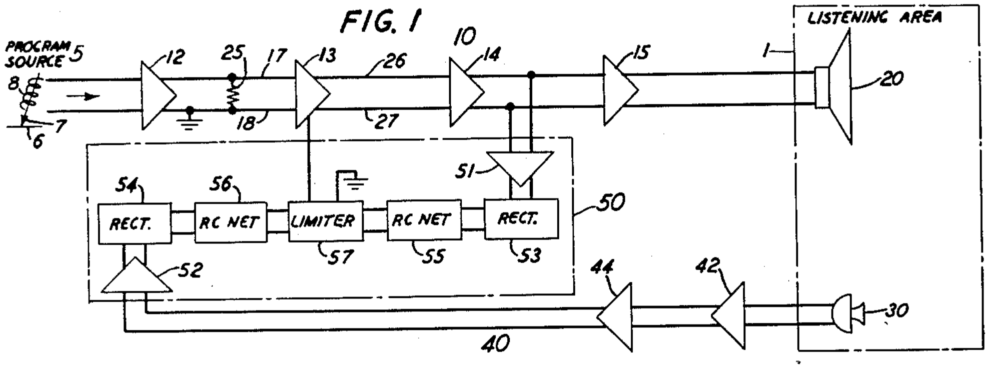
Fig. 1 is a block schematic of the system.

Referring to Fig. 1, 5 indicates generally a program source, symbolized by disc sound record 6 driven by mechanism (not shown) and traversed by an electromechanical reproducer consisting of a stylus 7 operating to generate in coil 8 a voltage representative of the sound recorded on disc 6.

The output voltage of coil 8 is amplified by the amplifiers of the program channel 10, which includes preamplifier 12, variable gain amplifier 13, line amplifier 14 and power amplifier 15. The final amplified voltage supplies power to loudspeaker 20, installed as may be desired in the listening area indicated by the dashed rectangle 1.

Also, in the listening area is located microphone 30, whereby noise in the area and also program sound therein is represented by an electrical quantity, voltage or current, amplified by the amplifiers of the microphone channel 40. These include preamplifier 42 and line amplifier 44.

It is here appropriate to anticipate part of the later description by pointing out that, in setting up the system of the invention, one so arranges the gain of the microphone channel that the power level at the output of line amplifier 44 shall be the same as the power level at the output of amplifier 14 when there is no noise in the listening area and the gain of the program channel has been set to provide a satisfactorily high sound level in the area. Hereinafter the output terminals of the line amplifiers 14 and 44 will be referred to as "bridging points."

Between the bridging points is connected a differential rectifier 50, the elements of which are described in detail in connection with Fig. 3. In the differential rectifier, means is provided for connecting in opposition rectified voltages corresponding respectively to the output of amplifier 14 and to that of amplifier 44. These rectified voltages differ when noise appears in the listening area and the difference voltage is supplied to increase the gain of variable gain amplifier 13 and therewith raise the sound level in the area to be satisfactorily above the noise level therein.

Figure 2:
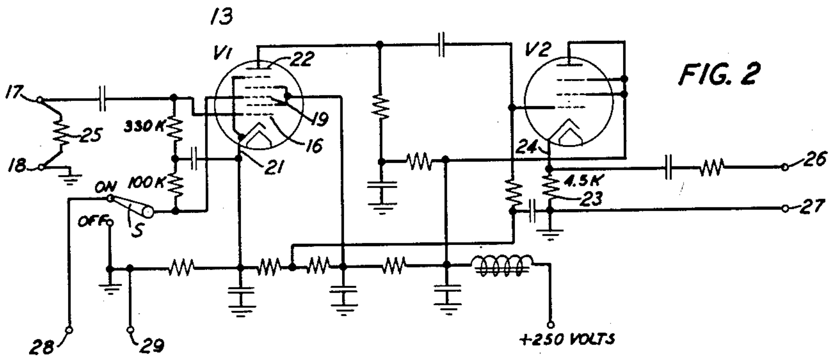
Fig. 2 is a circuit diagram of a variable gain amplifier suitable for use in the system.

Referring now to Fig. 2, variable gain amplifier 13 of Fig. 1 includes a multigrid tube V1, suitably a 1612, to control grid 16 of which is applied via a conventional connection the alternating voltage between terminals 17 and 18, which are the output terminals of preamplifier 12 of Fig. 1. Shielded grid 19 of tube VI is connected to the blade of switch S, which in position "on" is connected to terminal 28 of the control bias circuit of Fig. 3 and in position "off" to ground. Grids 16 and 19 are interconnected by two resistors in series as indicated in Fig. 2, the junction of these resistors being capacitatively connected to cathode 21 of tube V1. Anode voltage for tube V1 is supplied through well-known filtering means from a 250-volt "B" battery. Anode 22 is conventionally connected to the control grid of a cathode follower tube V2, preferable a 6J7 connected as a triode, resistor 23 being the connection between ground and cathode 24 of tube V2. The voltage across 4500-ohm resistor 23 is applied to conductors 26, 27, leading to amplifier 14.

Between terminals 17 and 18, the latter being grounded, is connected a 600-ohm resistor 25. It is understood that a like resistor (not shown) may if desired be connected across terminals 26 and 27 which are input terminals of line amplifier 14. Terminal 27 is grounded, and terminal 26 is connected by a capacitor in series with a resistor to cathode 24.

In the absence of voltage from the control bias circuit at terminals 28 and 29, when switch S is closed "on," the voltage gain of tubes V1 and V2 together is adjusted, by known procedures, to be zero decibel. A positive bias voltage applied to grid 19 increases correspondingly the gain of the circuit of Fig. 2 and therewith the power supplied to amplifier 15 and the sound level emitted by loudspeaker 20. The described operation of tube V1 is well known, being disclosed for example, in United States Patent 2,245,652, June 17, 1941, to J. E. Dickert.

It is understood that for the tubes V1 and V2 and others to be mentioned, cathode heating power (not shown) is provided.

Figure 3:
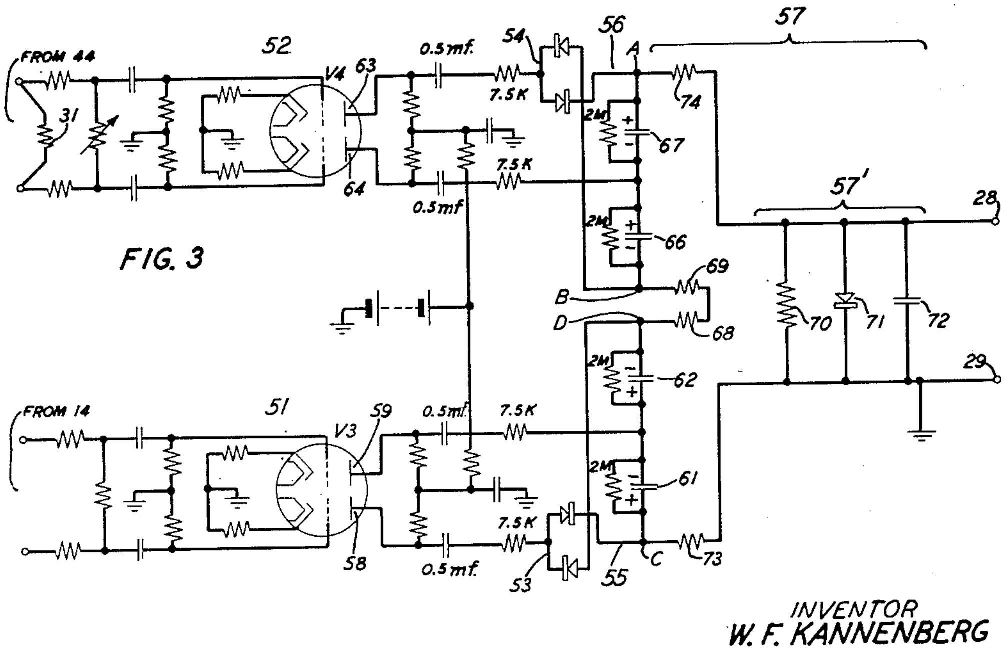
Fig. 3 is a circuit diagram of the circuits cooperating in the section of Fig. 1 designated by the numeral 50.

Control bias, corresponding to noise in the listening area, is derived from the circuit of Fig. 3, which shows the elements included in differential rectifier 50 of Fig. 1.

Referring again to Fig. 1, differential rectifier 50 includes preamplifiers 51 and 52, which respectively amplify the output voltages of line amplifiers 14 and 44 and supply these amplified voltages to rectifiers 53 and 54. In these rectifiers the program voltage of channel 10 and the program plus noise voltage in channel 40 are rectified and the resulting undirectional voltages are supplied to the respective time constant networks 55 and 56. The voltage across the output of network 55 is combined, in opposition, with that across the output of network 56 in limiter 57. From limiter 57, a voltage representing the noise in the listening area is supplied to control the gain of variable gain amplifier 13 of the program channel and therewith the sound level emitted by loudspeaker 20.

In Fig. 3 the numerals 51 and 52 are applied to designate generally the circuits of the preamplifiers correspondingly designated in Fig. 1 within differential rectifier 50. Each of these preamplifiers includes a 6SN7 tube, V3 and V4, respectively, each comprising two triodes to which in push-pull are connected the program power (amplifier 14) and the microphone power (amplifier 44) at the respective bridging points.

Inasmuch as amplifier 14 is terminated by the input impedance of power amplifier 15 while amplifier 44 has no termination other than the much higher input impedance of preamplifier 52, it is proper for circuit symmetry to provide resistor 31 across the input of preamplifier 52 to make the input impedance thereof equal that of power amplifier 15.

Anode 58 of tube V3 is connected through a condenser and a resistance in series to rectifier 53, which consists of a pair of Western Electric 34A varistors, or equivalent, connected in parallel opposition. The terminals of these varistors, remote from their common connection to the resistance, are connected respectively to the outer terminals of condensers 61—62 in series. To the junction of these condensers anode 59 is connected through a condenser and a resistance in series, similarly to the connection of anode 58 to rectifier 53. Each of condensers 61, 62 is shunted by a 2-megohm resistance, as shown, for the purpose of providing definite leakage resistance. It is clear that condensers 61 and 62 are charged, on alternate polarities of the program voltage, to a like potential, constituting together a voltage doubler.

In like manner the two triodes of tube V4 are supplied in push-pull with the voltage from line amplifier 44 of the microphone channel. This voltage combines the program and noise as picked up in the listening area by microphone 30.

Of tube V4, anodes 63 and 64 are connected, each through a condenser in series with a resistance, as are anodes 58 and 59 of tube V3, anode 63 to rectifier 54 like rectifier 53, anode 64 to the junction of condensers 66 and 67 shunted each by 2 megohms. The outer terminals of these condensers are connected to rectifier 54 as are the like terminals of condensers 61 and 62 to rectifier 53.

As is indicated in the circuit of Fig. 3, condensers 61 and 62 are charged in series with polarities as shown to a voltage representing the program level at the output of amplifier 14, while the voltage to which condensers 66 and 67 are charged represents the program plus noise level at the output of amplifier 44. The polarities of condensers 61, 62, 66 and 67 (each 1000 microfarads) are also shown in Fig. 3, but it will be noted that points A and C are positive while points B and D are negative in potential. In order to subtract the program power from the program plus noise power, points B and D are connected through two resistors 68 and 69 in series, each resistor being suitably of 60,000 ohms resistance. Consequently, the voltage between points A and C is the difference of the voltages A—B and C—D and so represents a differential voltage corresponding to the noise alone. It is this differential voltage which is supplied to limiter 57. Limiter 57 comprises a series portion and a shunt portion 57'. The series portion is a linear resistance of 240,000 ohms composed of the four 60,000-ohm resistors 68, 69, 73 and 74. The shunt portion is composed of resistive elements 70 and 71, a 240,000-ohm resistor and a varistor respectively, and 250-microfarad condenser 72. The resistive parallel components alone determine the steady-state (resistance)

characteristics of the shunt circuit whereas both resistive and capacitive parallel elements determine its transient behavior. The differential voltage (voltage A—B less voltage C—D) is applied across the series and shunt portion of the limiter in series. Only a fraction of this voltage therefore appears across the shunt portion. When the impedance of varistor 71 is large compared to the resistance of resistor 70, the voltage across resistor 70 is one-half the differential voltage. When the impedance of varistor 71 falls with increasing voltage the fraction of voltage appearing across resistor 70 will become less than half that appearing between A and C. This variable fraction is the useful cutput voltage of the limiter and accordingly appears across its output terminls 28 and 29, which are connected, respectively, to grid 19 of tube V1 when switch S is closed "on" and to ground. Limiter 57 receives at its input terminals a steady or slowly varying direct-current voltage and passes on by way of its output terminals a steady or slowly varying direct-current voltage which is never more than, and sometimes considerably less than, half the applied input voltage namely, that between A and C.

Resistors 68 and 69, in addition to contributing to the time constant of the series portion of limiter 57, serve to prevent the harmful effect which in their absence would be produced by the grounding of terminal 29.

Where important, and not elsewhere given, values of resistance and capacity are shown numerically in Figs. 2 and 3 in thousands (K) of ohms, in megohms (M), and in microfarads. Other and conventional circuit elements are not so identified.

Varistor 71 is constituted of three thallium-copper oxide pellets in series, the forward direction of which is from terminal 28 to terminal 29. Terminal 28 being positive to ground, the voltage thereby applied to grid 19 of tube V1 increases correspondingly the gain of amplifier 13, Fig. 2.

Figure 4:
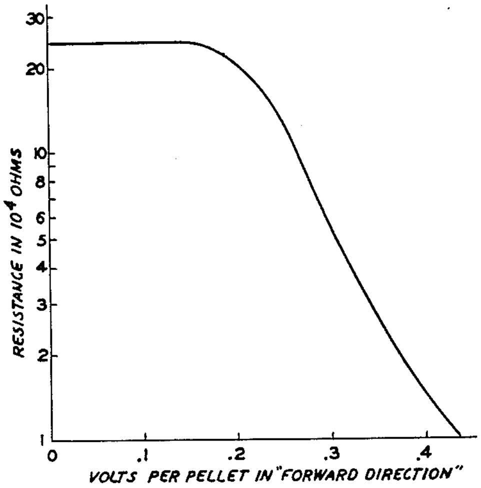
Fig. 4 is the electrical resistance characteristic of the shunt portion 57′ of the limiter 57 shown in Fig. 3.

Referring now to Fig. 4, the resistance of the parallel connection of resistor 70 and varistor 71 is shown to vary from 240,000 ohms to 10,000 ohms as the value of the applied voltage rises from zero to 0.47 volt per pellet, the drop in resistance beginning at 0.15 volt per pellet applied between the terminals of resistor 70. Correspondingly, of the differential voltage between program and microphone channels at the outputs of their respective line amplifiers the whole is effective up to a certain value, after which a smaller and smaller change is made in gain of amplifier 13 for a given increase in noise level. By suitable choice of size and number of copper oxide rectifier pellets, the noise level at which the droop begins and the rate at which it proceeds may be adjusted as desired.

As a result, the gain of amplifier 13 increases in equal step with the noise in the listening area up to a selected level of that noise, beyond which further increase in noise level brings about progressively less and less change in gain. The sound level from loudspear 20 varies directly with the gain of amplifier 13, up to the point of overload of power amplifier 15; the particular arrangement of limiter 57 above set forth avoided, in a trial installation, such overload of the power amplifier and resulted in an increase of program sound level with noise increase which was stable and within satisfactory limits as regards program quality and ratio of program sound level to noise.

Figure 5:
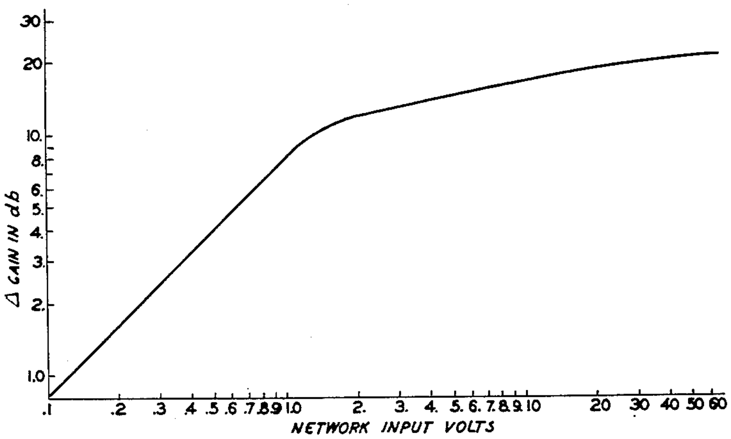
Fig. 5 shows the relation between the rise in gain of the amplifier of Fig. 2 with increase in net input voltage supplied to the network of Fig. 4.

Fig. 5 shows a plot of the gain of amplifier 13 as a function of the voltage applied across the limiting network 57. Volts as abscissae are plotted on a logarithmic scale, while amplifier gain in decibels is plotted on a like scale as ordinates. The limiting region of amplifier gain is shown in Fig. 5 as beginning at 1.0 volt input to the network preceding shunt portion 57'; this corresponds to 0.5 volt across portion 57' itself.

Figure 6:
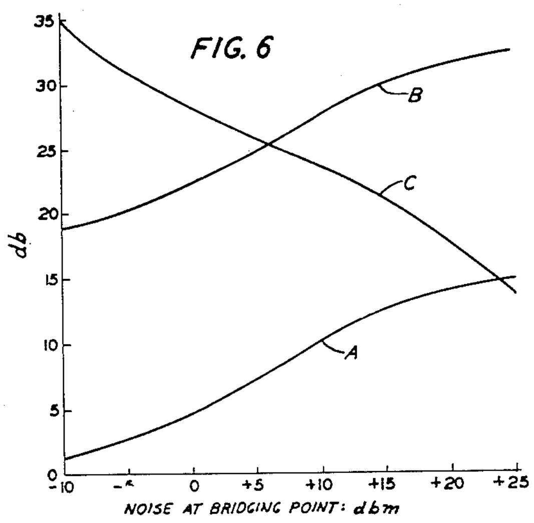
Fig. 6 is an actual characteristic obtained using the system of Fig. 1.

Fig. 6 shows in three curves A, B and C, the operation actually obtained with a system as in Fig. 1, when background music from disc records was played in a small restaurant where the noise level was capable of being artifically varied.

For the sake of illustration, consider the noise level at output of amplifier 44 (in absence of program) to vary from −10 to +25 dbm (decibels above one milliwatt). Assume the general program level to be +7.5 dbm in the absence of noise at the output of amplifier 14, and that this level, lifted 10 decibels by power amplifier 15, gave from the loudspeaker a sound level 35 decibels above the noise when the latter was represented by −10 dbm at the output of amplifier 44. Where there no provision at all for raising the program level as the noise increased, this signal-to-noise ratio would fall from 35 decibels to zero decibels at the highest noise level. If on the other hand, the program level were to increase, decibel for decibel, with increase of noise, when the latter reached +25 dbm the loudspeaker power would rise from +17.5 dbm (10 decibels gain in amplifier 15 added to +7.5 dbm at output of amplifier 14) to +52.5 dbm with probable overload of the power amplifier and excessively loud sound if a sudden break came in the noise. Curve A shows the gain change in amplifier 13 as the noise level at the bridging point of the microphone channel rises from −10 to +25 dbm. Curve B shows the corresponding rise in loudspeaker power above the +17.5 dbm assumed at the noise level −10 dbm. Curve C represents the decrease in signal-noise ratio, from 35 decibels assumed for a noise level of −10 dbm to 13.6 decibels at a noise level of +25 dbm; without the automatic gain control of the program channel, the program music would have been lost in the noise.

Curve A is the locus of points of stable equilibrium. At any point on this curve the system is in static equilibrium, so that provided no change in noise or program occurs, no change in controlled amplifier gain will occur either. For a system to have dynamic stability, however, the satisfaction of steady-state requirements is a necessary but not a sufficient condition. To be dynamically stable as well, the system must in addition possess a transient behavior which tends to contract rather than expand system gain.

Referring again to Fig. 3, the reason for the stability of the described system (meaning thereby the tendency for the bias control voltage to return to an earlier value as the noise level itself so returns) is seen to lie in the fact that three suitably proportioned time constant circuits are provided. These are: first, the two 1,000-microfarad condensers 61 and 62, each in series with a 7,500-ohm resistor and shunted by 2 megohms, constituting the program channel RC network 55 of Fig. 1; second, the similar condenser-resistance circuit constituting the microphone channel RC network 56 of Fig. 1; third, the limiter circuit 57.

Suppose the condensers in each channel to be charged due to program power alone, directly received from amplifier 51 by network 55, and received by acoustic pick-up from the loudspeaker by network 56. The charging circuit of each of these condensers has a nominal time constant of 7.5 seconds (7,500 ohms × 1000 microfarads). Since charging is discontinuous the effective time constant is much larger than this. Charging current will flow only when a voltage peak in the conducting direction occurs, which already cuts in half the charging time. Furthermore charging current will flow only during that portion of a properly poled peak in which the actually developed voltage exceeds the direct-current voltage to which the condenser has already been charged; this further reduces opportunity for charging current to flow, so that the charging time is halved again. Since the nature of the driving voltage obtained from either channel is generally not sinusoidal, but consists of random alternately poled peaks of varying magnitude and spacing depending upon the nature of the music (over the program channel) and upon the nature both of the music and of the noise (over the microphone channel), charging time is cut further. Assume for example that the cut in charging time assignable to this effect is to only 10 per cent of the charging time reduced as above to 25 per cent. At 100 per cent charging time (as would occur with properly poled constant amplitude D. C.) the effective time constant would be 7.5 seconds as calculated, but at 2.5 per cent the effective time constant will be 7.5 divided by 0.025 or 300 seconds. Thus, on the type of discontinuous signal likely to be encountered, the condensers will charge in roughly 300 seconds, or 5 minutes, to the same extent as an application of a continuous and constant voltage of the same value for only 7.5 seconds would produce.

The discharge of these separate but similar circuits occurs through 2-megohm resistors shunting each of condensers 61, 62, 66 and 67. Since in this case the discharge occurs on a continuous basis, the effectiveness of discharge is 100 per cent, making the effective discharge time constant 2000 seconds or 33⅓ minutes (2 megohms × 1,000 microfarads). Since rectifiers 53 and 54 and networks 55 and 56 of Fig. 1 are identical, condensers 61, 62 and 66, 67 will respond equally rapidly and in perfect step with each other to variations in average program power, so that no difference voltage appears between points A and C and the gain of amplifier 13 remains at zero decibels as initially adjusted. On cessation of the program, the 1000-microfarad condensers dissipate their charge at equal rate (at the 33-minute time constant rate) so that the gain of amplifier 13 remains at zero decibel since during discharge no difference voltage will appear between points A and C.

In the presence of noise, a difference voltage appears between points A and C. At low values one-half of this voltage is passed on by the limiter; at high values the transmitted fraction is less than half. Thus the difference voltage between A and C is the source from which the RC circuit 57′ comprising condenser 72 and resistor 70 charges through the four 60,000-ohm resistors 68, 69, 73 and 74. Thus, at cessation of noise the full difference voltage between A and C across four 1,000-microfarad condensers in series, minus the voltage across shunt portion 57′ (approximately half that between A and C), attempts to discharge through the four 60,000-ohm resistors. On this basis, the discharge time constant of the circuit tied to A and C is 1000/4 microfarads × 240,000 ohms, or 60 seconds. But circuit 57′, in complete absence of energy supplied from A and C, has a discharge path through resistor 70 which is of 240,000 ohms resistance. At higher voltages varistor 71 makes the discharge path lower in resistance. Hence maximum discharge time constant of this limiter circuit RC network acting alone is $250 \times 10^{-6} \times 240{,}000$, or 60 seconds. Both circuits having identical time constants, the discharge time constant of their combination is twice that, or 120 seconds. This is the case for voltages across the limiter shunt path 57′ of 0.5 volt or less. At higher voltages than this the impedance of varistor 71 begins to fall rapidly to values approaching 10,000 ohms. Accordingly the time constant of the circuit 57′ approaches 2.5 seconds. Therefore at higher voltages the overall discharge time constant approaches that of the voltage difference source, A and C, or 60 seconds. Accordingly, a higher limiter output voltage will tend to be reduced at a rate almost twice as fast as one of 0.5 volt or less.

Thus, since the effective charging time constant controlling voltage build-up on the condenser banks is of the order of five minutes, while the effective normal discharge time constant applying to differential voltages is of the order of two minutes, the direct-current output of the limiter will tend to follow slowly changing ambient noise quite faithfully except for the steady-state limiting effect previously described in connection with Fig. 6, and for the tendency to restore faster from a high output voltage. Transient behavior as a result of noise bursts of prolonged duration brings about operation as follows:

The first of the prolonged noise bursts starts driving up the voltage across the microphone channel condensers 66 and 67, which increases the voltage differential, the controlled amplifier gain, and the program channel voltage on condensers 61 and 62. But the sound level in the listening area due to program is also raised so that as end result both these condenser voltages and the voltage differential A—C are appreciably higher than normal. The effect of the higher condenser voltages is to increase the effective charging time constants of condensers 61, 62, 66 and 67 since a given voltage peak applied will cause less charging current to flow than before. As previously pointed out, the excessive differential voltage will tend to restore rapidly at the first opportunity between noise blasts, thereby bringing down the elevated program sound level. Since the voltages of condensers 61, 62, 66 and 67 will dissipate rather slowly, the temporarily reduced sensitivity of the charging circuit will tend to restrain the adverse effects of succeeding noise bursts until previous conditions are completely reestablished. The extent of this secondary effect is controllable by adjustment of the discharge time constant of the condenser banks (change of the 2-megohm resistors to some other value).

Thus the advantages resulting from the provision of limiter 57 are: first, at normal noise levels and normal rates of variation in general noise level, the variation of loudspeaker level is unobtrusive; second, at suddenly occurring prolonged noise bursts the program level increase occurs initially at normal rate, but subsequent bursts are less capable of driving up loudspeaker level; third, the higher the previous noise level, the more rapidly will the reduction in sound output occur with cessation of the noise or the sudden reduction in the level thereof. The result is in all cases to make the program rendition follow average noise level without disconcerting upward or downward spurts, without periods of excessive signal-to-noise ratio, and with continuous stability.

What is claimed is:

1. A sound reproducing system adapted to reproduce sound in a noisy listening area at a sound level appropriately related to the noise level in the area comprising, in combination, an electrical sound reproducing channel of variable gain, an electrical channel including a microphone responsive to the reproduced sound and the noise and means for amplifying the response of the microphone, means for deriving from the first-named channel a first unidirectional voltage of magnitude corresponding to the sound level, means for deriving from the second-named channel a second unidirectional voltage of magnitude corresponding to the amplified response of the microphone, means for deriving from the first and second voltages a differential voltage, means for progressively limiting a fraction of the differential voltage with progressive increase of the differential voltage and means for applying the limited fractional voltage to vary the gain of the first-named channel.

2. A sound reproducing system as in claim 1 wherein each of the unidirectional voltages is impressed on a resistance-capacity circuit having a charging time constant nominally of the order of seconds and a discharging time constant of the order of minutes, and wherein the limiting means comprises a resistance-capacity circuit having a time constant decreasing from the order of minutes to the order of seconds with increase in value of the differential voltage.

WALTER F. KANNENBERG.

REFERENCES CITED

The following references are of record in the file of this patent:

UNITED STATES PATENTS

| Number | Name | Date |
|---|---|---|
| 1,356,403 | Pridham | Oct. 19, 1920 |
| 2,338,551 | Stanko | Jan. 4, 1944 |
| 2,382,848 | Baumgartner | Aug. 14, 1945 |
| 2,392,218 | Anderson | Jan. 1, 1946 |
| 2,420,933 | Crawford et al. | May 20, 1947 |
| 2,462,532 | Morris | Feb. 22, 1949 |
| 2,501,327 | Good | Mar. 21, 1950 |